US006455103B1

United States Patent
Mennig et al.

(10) Patent No.: US 6,455,103 B1
(45) Date of Patent: Sep. 24, 2002

(54) METHOD FOR PRODUCING MULTILAYERED OPTICAL SYSTEMS

(75) Inventors: Martin Mennig, Quierschied (DE); Peter W. Oliveira, Saarbruecken (DE); Helmut Schmidt, Saarbruecken-Guedingen (DE)

(73) Assignee: Institut fuer Neue Materialien gemeinnutzige GmbH, Saarbruecken (DE)

(*) Notice: Subject to any disclaimer, the term of this patent is extended or adjusted under 35 U.S.C. 154(b) by 0 days.

(21) Appl. No.: 09/700,100

(22) PCT Filed: May 26, 1999

(86) PCT No.: PCT/EP99/03621
§ 371 (c)(1),
(2), (4) Date: Nov. 8, 2000

(87) PCT Pub. No.: WO99/61383
PCT Pub. Date: Dec. 2, 1999

(30) Foreign Application Priority Data

May 27, 1998 (DE) .......................................... 198 23 732

(51) Int. Cl.$^7$ .............................. B05D 5/06; G02B 1/10; G02B 1/11
(52) U.S. Cl. .................... 427/165; 427/169; 427/419.3; 427/508; 359/580; 359/581; 359/588
(58) Field of Search ................................ 427/487, 508, 427/515, 164, 165, 180, 190, 383.5, 404, 407.2, 419.3, 512, 168, 169, 198, 202, 372.2, 384, 389.7; 359/580, 581, 586, 587, 568, 588

(56) References Cited
U.S. PATENT DOCUMENTS 4,830,879 A * 5/1989 Debsikdar .................... 427/162
6,280,838 B1 * 8/2001 Bernards et al. ............ 428/325

FOREIGN PATENT DOCUMENTS

WO    WO 98/34884    * 8/1998

OTHER PUBLICATIONS

Oliveiria et al., "Generation of wet–chemical AR coatings on plastic substrates by use of polymerizable nanoparticles", SPIE vol. 3136, 1997, pp. 452–461.*
Reference to Cyracure® cationic cure systems on Eastech Chemical Website (page http://www.eastechchemical.com/prdc/func/FO238en.shtml); and "094–Cyracure_Product_Guide.PDF", pp. 1,2,10, and 12, accessed through that Website.
Reference to Irgacure® and Darocur® photoinitiators from "photoinitiators_UV_curing.pdf", accessed from Ciba Specialty Chemicals Website www.cibasc.com/radtech2001/download/photoinitiators_for_UV_curing-.pdf.
Reference to BYK®–306 silicone surface additive from Byk Chemie Website http://www.byk–chemie.com/download/s2–d.pdf.

* cited by examiner

Primary Examiner—Shrive P. Beck
Assistant Examiner—Wesley Markham
(74) Attorney, Agent, or Firm—Heller Ehrman White & McAuliffe LLP

(57) ABSTRACT

Inorganic multilayered optical systems are produced by applying to a glass substrate a flowable composition containing nanoscale solid inorganic particles containing polymerizable or polycondensable organic surface groups, polymerizing and/or polycondensing those surface groups to form an organically crosslinked layer, applying to the organically crosslinked layer and polymerizing/polycondensing a flowable composition producing a different refractive index from the first layer (optionally repeated one or more times), and one-step thermal densifying and removing the organic components. The systems so produced are suitable as interference filters and antireflection systems.

19 Claims, 2 Drawing Sheets

METHOD FOR PRODUCING MULTILAYERED OPTICAL SYSTEMS

BACKGROUND OF THE INVENTION

The invention relates to a method for producing multi-layered optical systems by a one-step baking method ("stack baking").

Multilayered systems having an optical effect can be produced on glass by the so-called sol-gel process; see, for example, Dislich et al. DE 1941191. The principle of this production method is that the corresponding glass substrate is coated with a sol by an immersion process, dried at elevated temperatures and baked in order to achieve densification. After pre-drying at temperatures of >100° C., it is also possible to apply a further layer by immersion and to bake the two layers in one step. The pre-drying at elevated temperatures is necessary in order to provide the first layer with adequate chemical stability, since it is otherwise partially or fully dissolved by the new coating sol. The layer thickness which can be achieved with a plurality of layers, without prior densification of each individual layer by sintering, is about 0.5 $\mu$m, since otherwise cracking occurs. The cracking occurs as a consequence of the already strong three-dimensional crosslinking of the porous layer systems, since the shrinkage which occurs on heating can no longer be dissipated by stress relaxation. In addition, the method is also complex since heat treatment is necessary after each layer application and in the case of a plurality of layers, baking at temperatures of 400–500° C. becomes necessary. The production of multilayered systems, as necessary in specific optical applications (broad-band antireflection coating, diathermic mirrors, etc.), becomes extremely labour-intensive and expensive.

Although it has been shown in WO 93/24424 that the incorporation of relaxation mechanisms enables thick layers to be produced as well, these cannot, however, be used to achieve an optical effect since they do not satisfy the condition of quarter-wave ($\lambda$/4) layers.

SUMMARY OF THE INVENTION

The object of the invention was to produce multilayered optical systems as far as possible without complex intermediate heating steps in such a way that the optical effect later desired occurs.

This object is achieved in accordance with the invention by a method for producing multilayered optical systems which comprises the following steps:

a) application of a flowable composition comprising nanoscale inorganic solid particles containing polymerizable and/or polycondensable organic surface groups to a glass substrate;

b) polymerization and/or polycondensation of the surface groups of the solid particles with formation of an organically crosslinked layer;

c) application to the organically crosslinked layer of a further composition in accordance with a) which produces a different refractive index to the previous composition;

d) polymerization and/or polycondensation of the surface groups of the solid particles with formation of a further organically crosslinked layer;

e) if desired, repetition of steps c) and d) one or more times with formation of further organically crosslinked layers on the organically crosslinked layers already present and/or on other surfaces of the substrate; and f) one-step thermal densification of the multilayer system and removal of the organic constituents present by baking.

DETAILED DESCRIPTION OF THE INVENTION

Figure 1:
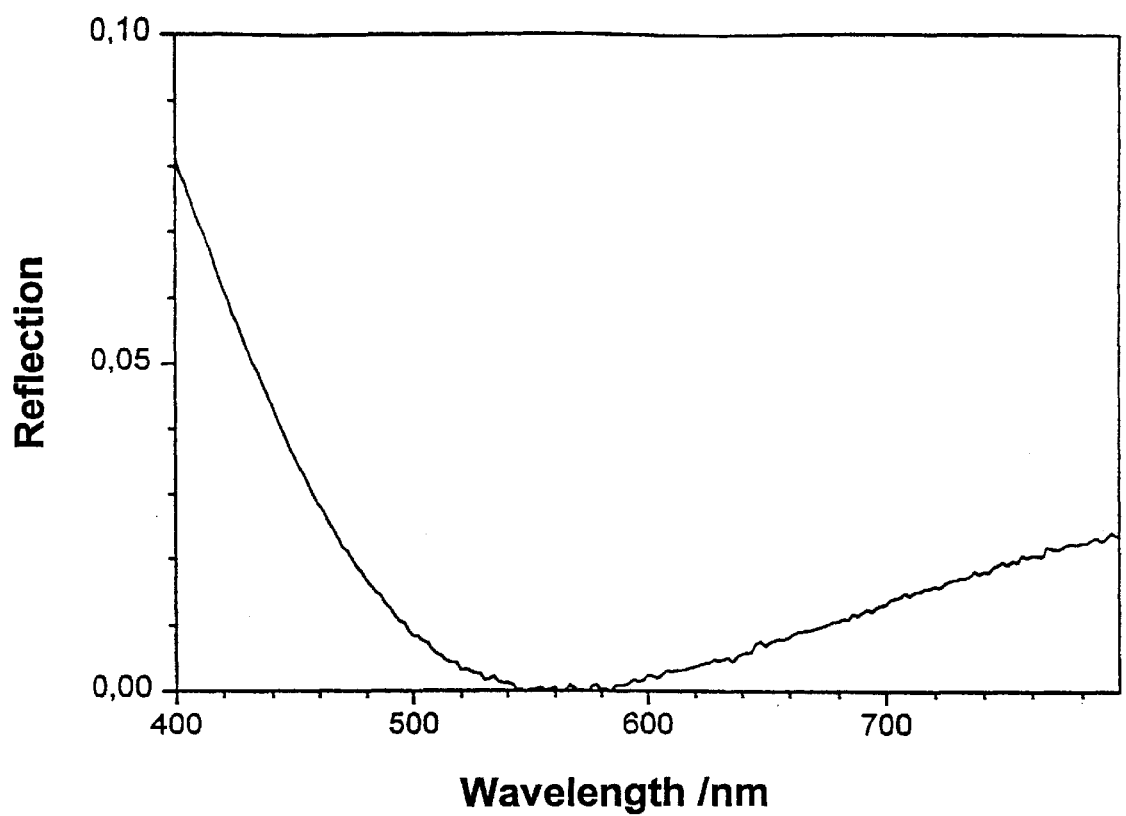
FIG. 1 shows the reflection spectrum of a glass sheet treated in accordance with Example 5.

The use of nanoscale particles coated with polymerizable and/or polycondensable groups gives rise to the possibility of producing chemically stable layers even at very low temperatures, for example via photopolymerization, and in this way applying further layers by the same method. It has been found here, entirely surprisingly, that these layers can be densified without cracking, even in the case of layer systems having up to 10 or more individual layers, and that their optical effect can be calculated accurately in advance. This is given by the content of inorganic components in the respective coating system, the amount applied (layer thickness) and the refractive index achieved after final thermal densification.

In the present description and the appended claims, the term "nanoscale inorganic solid particles" is taken to mean particles having a mean particle size (mean particle diameter) of not greater than 200 nm, preferably not greater than 100 nm, and in particular not greater than 70 nm. A particularly preferred particle size range is from 5 to 50 nm.

The nanoscale inorganic solid particles can consist of any desired materials, but preferably consist of metals and in particular of metal compounds, such as, for example, "optionally hydrated" oxides, such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$; chalcogenides, such as, for example, sulphides (for example CdS, ZnS, PbS and $Ag_2S$), selenides (for example GaSe, CdSe and ZnSe) and tellurides (for example ZnTe or CdTe), halides, such as AgCl, AgBr, AgI, CuCl, CuBr, $CdI_2$ and $PbI_2$; carbides, such as $CdC_2$ or SiC; arsenides, such as AlAs, GaAs and GeAs; antimonides, such as InSb; nitrides, such as BN, AlN, $Si_3N_4$ and $Ti_3N_4$; phosphides, such as GaP, InP, $Zn_3P_2$ and $Cd_3P_2$; phosphates, silicates, zirconates, aluminates, stannates and corresponding mixed oxides (for example those having a perovskite structure, such as $BaTiO_3$ and $PbTiO_3$)

The nanoscale inorganic solid particles employed in the method according to the invention are preferably those of oxides, sulphides, selenides and tellurides of metals and mixtures thereof. In accordance with the invention, particular preference is given to nanoscale particles of $SiO_2$, $TiO_2$, $ZrO_2$, ZnO, $Ta_2O_5$, $SnO_2$ and $Al_2O_3$ (in all modifications, in particular as boehmite, AlO(OH)) and mixtures thereof.

Since the nanoscale particles which can be employed in accordance with the invention cover a broad range of refractive indices, the refractive index of the layer(s) can be set to the desired value in a comfortable manner through a suitable selection of these nanoscale particles.

The nanoscale solid particles employed in accordance with the invention can be produced in a conventional manner, for example by flame pyrolysis, plasma methods, gas-phase condensation methods, colloid techniques, precipitation techniques, sol-gel processes, controlled nucleation and growth processes, MOCVD methods and (micro) emulsion methods. These methods are described in detail in the literature. In particular, it is possible to use, for example, metals (for example after reduction in the precipitation method), ceramic oxidic systems (by precipitation from solution), but also salt-like or multicomponent systems. The salt-like or multicomponent systems also include semiconductor systems.

The production of the nanoscale inorganic solid particles provided with polymerizable and/or polycondensable organic surface groups which are employed in accordance with the invention can be carried out by, in principle, two different methods, namely firstly by surface modification of pre-produced nanoscale inorganic solid particles and secondly by production of these inorganic nanoscale solid particles using one or more compounds which contain polymerizable and/or polycondensable groups of this type. These two methods are described in greater detail below and in the examples.

The organic polymerizable and/or polycondensable surface groups can be any desired groups known to the person skilled in the art which are able to undergo free-radical, cationic or anionic, thermal or photochemical polymerization or thermal or photochemical polycondensation (if necessary in the presence of a suitable initiator or catalyst). In accordance with the invention, preference is given to surface groups which contain a (meth)acrylyl, allyl, vinyl or epoxide group, particular preference being given to (meth)acrylyl and epoxide groups. In the case of groups which are capable of undergoing polycondensation, mention should be made, in particular, of hydroxyl, carboxyl and amino groups, with the aid of which ether, ester and amide bonds between the nanoscale particles can be obtained.

It is also preferred in accordance with the invention for the organic groups present on the surfaces of the nanoscale particles, which groups include the polymerizable and/or polycondensable groups, to have a relatively low molecular weight. In particular, the molecular weight of the (purely organic) groups should not exceed 500 and preferably 300, particularly preferably 200. Of course, this does not exclude a significantly higher molecular weight of the compounds (molecules) containing these groups (for example 1000 or more).

As already mentioned above, the polymerizable/polycondensable surface groups can in principle be provided by two methods. If surface modification of pre-produced nanoscale particles is carried out, suitable compounds for this purpose are all (preferably low-molecular-weight) compounds which firstly have one or more groups which are able to react or at least interact with functional groups (such as, for example, OH groups in the case of oxides) present on the surface of the nanoscale solid particles, and secondly have at least one polymerizable/polycondensable group. Thus, the corresponding compounds can, for example, form both covalent and ionic (salt-like) or coordinative (complex) bonds to the surface of the nanoscale solid particles, while pure interactions which may be mentioned by way of example are dipole-dipole interactions, hydrogen bridges and van der Waals interactions. Preference is given to the formation of covalent and/or coordinative bonds. Specific examples of organic compounds which can be used for the surface modification of the nanoscale inorganic solid particles are, for example, unsaturated carboxylic acids, such as acrylic acid and methacrylic acid, β-dicarbonyl compounds (for example β-diketones or β-carbonylcarboxylic acids) containing polymerizable double bonds, ethylenically unsaturated alcohols and amines, amino acids, epoxides and the like. Compounds of this type which are particularly preferred in accordance with the invention are—in particular in the case of oxidic particles—hydrolytically condensable silanes containing at least (and preferably) one non-hydrolyzable radical which contains a polymerizable carbon-carbon double bond or an epoxide ring. Silanes of this type preferably have the general formula (I):

in which X is $CH_2=CR^3-COO$, $CH_2=CH$ or glycidyloxy, $R^3$ is hydrogen or methyl, $R^1$ is a divalent hydrocarbon radical having 1 to 10, preferably 1 to 6, carbon atoms which optionally contains one or more heteroatom groups (for example O, S or NH) which separate adjacent carbon atoms from one another, and the radicals $R^2$, identical to or different from one another, are selected from alkoxy, aryloxy, acyloxy and alkylcarbonyl groups and halogen atoms (in particular F, Cl and/or Br).

The groups $R^2$ are preferably identical and selected from halogen atoms, $C_{1-4}$-alkoxy groups (for example methoxy, ethoxy, n-propoxy, i-propoxy and butoxy), $C_{6-10}$ aryloxy groups (for example phenoxy), $C_{1-4}$-acyloxy groups (for example acetoxy and propionyloxy) and $C_{2-10}$-alkylcarbonyl groups (for example acetyl).

Particularly preferred radicals $R^2$ are $C_{1-4}$-alkoxy groups and in particular methoxy and ethoxy.

The radical $R^1$ is preferably an alkylene group, in particular one having 1 to 6 carbon atoms, such as, for example, ethylene, propylene, butylene or hexylene. If X is $CH_2=CH$, $R^1$ is preferably methylene and can in this case also be a simple bond.

X is preferably $CH_2=CR^3-COO$ (in which $R^3$ is preferably $CH_3$) or glycidyloxy. Accordingly, particularly preferred silanes of the general formula (I) are (meth)-acryloyloxyalkyltrialkoxysilanes, such as, for example, 3-methacryloyloxypropyltri(m)ethoxysilane, and glycidyloxyalkyltrialkoxysilanes, such as, for example, 3-glycidyloxypropyltri(m)ethoxysilane.

If the nanoscale inorganic solid particles have already been produced using one or more compounds which contain polymerizable/polycondensable groups, subsequent surface modification can be omitted (although this is of course possible as an additional measure).

The in-situ production of nanoscale inorganic solid particles containing polymerizable/polycondensable surface groups is explained below using the example of $SiO_2$ particles. For this purpose, the $SiO_2$ particles can be produced, for example, by the sol-gel process using at least one hydrolytically polycondensable silane containing at least one polymerizable/polycondensable group. Suitable silanes of this type are, for example, the silanes of the general formula (I) already described above. These silanes are preferably employed either alone or in combination with a suitable silane of the general formula (II)

in which $R^2$ is as defined above. Preferred silanes of the above general formula (II) are tetramethoxysilane and tetraethoxysilane.

It is of course also possible, in addition or as an alternative to the silanes of the general formula (II), to employ other silanes, for example those which contain a (non-hydrolyzable) hydrocarbon group without any functional group, such as, for example, methyl- or phenyltrialkoxysilanes.

The composition employed in the process according to the invention is in the form of a material which is still flowable (suspension). The liquid constituent of this material is composed, for example, of water and/or (preferably water-miscible) organic solvents and/or compounds which were employed or formed during the production of the nanoscale particles or their surface modification (for example alcohols in the case of alkoxysilanes). Any suitable organic solvents additionally employed are, for example, alcohols, ethers, ketones, esters, amides and the like. However, an (additional) constituent of the flowable material can also be, for example, at least one monomeric or oligomeric species which contains at least one group which is able to react (polymerize or polycondense) with the polymerizable/polycondensable groups present at the surface of the nanoscale particles. Examples of such species which may be mentioned are monomers containing a polymerizable double bond, such as, for example, acrylates, methacrylates, styrene, vinyl acetate and vinyl chloride. Preferred monomeric compounds containing more than one polymerizable bond are, in particular, those of the general formula (III):

$$(CH_2=CR^3-COZ-)_n-A \quad (III)$$

in which n=2, 3 or 4, preferably 2 or 3, in particular 2;

Z=O or NH, preferably O;

$R^3$=H or $CH_3$;

A an n-valent hydrocarbon radical having 2 to 30, in particular 2 to 20, carbon atoms, which may contain one or more heteroatom groups, each located between two adjacent carbon atoms (examples of such heteroatom groups are O, S, NH, NR (R=hydrocarbon radical), preferably O).

The hydrocarbon radical A may furthermore carry one or more substituents, which are preferably selected from halogen (in particular F, Cl and/or Br), alkoxy (in particular $C_{1-4}$-alkoxy), hydroxyl, optionally substituted amino, $NO_2$, $OCOR^5$, $COR^5$ ($R^5$=$C_{1-6}$-alkyl or phenyl). However, the radical A is preferably unsubstituted or substituted by halogen and/or hydroxyl.

In one embodiment of the present invention, A is derived from an aliphatic diol, an alkylene glycol, a polyalkylene glycol or an optionally alkoxylated (for example ethoxylated) bisphenol (for example bisphenol A).

Other suitable compounds containing more than one double bond are, for example, allyl (meth)acrylate, divinylbenzene and diallyl phthalate. It is likewise possible, for example, to use a compound containing two or more epoxide groups (in the case of the use of epoxide-containing surface groups), for example bisphenol A diglycidyl ether or alternatively an (oligomeric) precondensate of a hydrolyzable silane containing epoxide groups (for example glycidoxypropyltrimethoxysilane).

The proportion of organic components in the coating compositions used in accordance with the invention is preferably not greater than 20 percent by weight, based on the solids content. It can be, for example, 5 percent by weight for layers of high refractive index and, for example, 15 percent by weight for layers of low refractive index.

The coating composition used in accordance with the invention preferably has a pH of ≧3, particularly preferably ≧4. In general, the pH is in the neutral region up to about 8, preferably up to about 7.5.

In step a) of the method according to the invention, the coating composition is applied to a glass substrate in order to coat this fully or partly. The coating methods which are suitable for this purpose are the conventional methods known to the person skilled in the art. Examples thereof are dipping, spraying, knife coating, spreading, brushing or spin coating.

Before application to the substrate, the flowable material can be set to a suitable viscosity, for example by addition of solvent or evaporation of volatile constituents (in particular solvent already present).

Before application of the flowable material, the substrate can, if necessary, be subjected to pretreatment (for example cleaning, degreasing, etc.).

In step b) of the method according to the invention, a polymerization and/or polycondensation of the polymerizable/polycondensable surface groups of the nanoscale inorganic solid particles (and, where appropriate, the polymerizable/polycondensable groups of the monomeric or oligomeric species additionally employed) is carried out. This polymerizable/polycondensation can be carried out in the manner which is customary to the person skilled in the art. Examples of suitable methods are thermal, photochemical (for example using UV radiation), electron beam curing, laser curing, room-temperature curing, etc. If necessary, a polymerization/polycondensation of this type is carried out in the presence of a suitable catalyst or initiator, which is added to the flowable material at the latest immediately before application thereof to the substrate.

Suitable initiators/initiator systems are all conventional initiators/initiator systems which are known to the person skilled in the art, including free-radical photoinitiators, free-radical thermoinitiators, cationic photoinitiators, cationic thermoinitiators and any desired combinations thereof.

Specific examples of free-radical photoinitiators which can be employed are IRGACURE® 184 (1-hydroxycyclohexyl phenyl ketone), IRGACURE® 500 (1-hydroxycyclohexyl phenyl ketone and benzophenone), and other photoinitiators sold under the IRGACURE® trademark by Ciba-Geigy, DAROCUR® 1173, 1116, 1398, 1174, and 1020 photoinitiators (obtainable from Merck); benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone.

Examples of free-radical thermoinitiators are, inter alia, organic peroxides in the form of diacyl peroxides, peroxydicarbonates, alkyl peresters, alkyl peroxides, perketals, ketone peroxides and alkyl hydroperoxides, and also azo compounds. Specific examples which may be mentioned here are, in particular, dibenzoyl peroxide, tert-butyl perbenzoate and azobisisobutyronitrile.

An example of a cationic photoinitiator is CYRACURE® UVI-6974 (mixed triarylsulfonium hexafluoroantimonate salts), while a preferred cationic thermal initiator is 1-methylimidazole.

These initiators are employed in the usual amounts known to the person skilled in the art (preferably 0.01–5% by weight, in particular 0.1–2% by weight, based on the total solids content of the coating composition). It is of course also possible to omit the initiator completely under certain circumstances, such as, for example, in the case of electron beam or laser curing.

The polymerization/polycondensation in step b) of the method according to the invention is preferably carried out thermally or by irradiation (in particular using UV light). Particular preference is given to photochemical polymerization/polycondensation or a combination of thermal and photochemical polymerization/polycondensation.

Prior to the polymerization/polycondensation, further volatile, non-polymerizable/non-polycondensable compounds can be removed from the layer applied to the substrate. This removal of volatile constituents can, however, alternatively or additionally be carried out at the polymerization/polycondensation stage or thereafter.

A typical method according to the invention will be outlined below by way of example, the stated value ranges and procedures having general validity irrespective of the materials employed specifically.

Nanoscale particles of, for example, $SiO_2$, $TiO_2$, $ZrO_2$ or other oxidic or sulphidic materials (particle size from 30 to 100 nm, preferably from 40 to 70 nm) are dispersed in a solvent (for example in a lower alcohol, such as methanol, ethanol or propanol) in a concentration of from 1 to 20% by weight, preferably from 5 to 15% by weight, and a surface modifier containing polymerizable/polycondensable groups is added, preferably in an amount of from 2 to 25% by weight, in particular from 4 to 15% by weight (based on the total solids content). In the case of the use of silanes, for example, the surface modification can be carried out by stirring for several hours at room temperature. Subsequently, if desired, a monomeric or oligomeric material containing polymerizable/polycondensable groups which is compatible with the surface modifier or the surface groups can be added in an amount of, for example, up to 20% by weight, preferably from 4 to 15% by weight (based on the total solids content).

After adjustment of the viscosity by addition or removal of solvent, one or more suitable initiators (in each case in an amount of, for example, from 0.01 to 5% by weight, based on the total solids content) and, if desired, other conventional additives are added.

The coating composition is then applied to the substrate, with the application rate generally being selected, depending on the desired refractive index and area of application, in such a way that layer thicknesses in the range from 50 to 200 nm, preferably from 100 to 150 nm, are achieved.

The subsequent polymerization/polycondensation (crosslinking) is carried out at relatively low temperature, preferably in the temperature range from 10 to 50° C., in particular from 10 to 30° C., and particularly preferably at room temperature.

In order to minimize the reaction times, a photopolymerization is preferably employed; in this case, any desired light sources, in particular UV light-emitting sources, can be used (for example mercury vapour lamps, xenon lamps or laser light).

One or more further layers are applied to the resultant organically crosslinked layer in the manner described until the desired multilayer system is obtained. In the case of the final (outermost) layer, a separate crosslinking step is no longer necessary, but instead this can take place directly in the subsequent sealing and baking step f).

In step f), the multilayered system is heated at temperatures of from 400 to 800° C., preferably from 400 to 600° C. and in particular from 400 to 500° C., and held at this temperature for, for example, from 1 minute to 1 hour. Complete removal of the organic (carbon-containing) constituents is carried out in this way without cracking or other defects occurring.

For this purpose, it is preferred to carry out the densification and baking in step f) in such a way that the multilayered system is heated from the outside inward in the direction of the substrate. This makes it possible for the organic constituents present in the interior of the system to escape through the pre-heated outer layers. For the same reason, the layers are preferably heated at a heating rate of at least 100 K/min.

The multilayered optical systems produced in accordance with the invention are suitable, for example, as interference and anti-reflection systems for the following applications:

Optical filters: antireflection and reflection filters in the area of the spectacles industry, displays, display screens, semiconductor lasers, microlens coating, solar cells, damage-resistant laser layers, band pass filters, antireflection filters, absorption filters and beam splitters.

Holographic layers: light deflection systems, information storage, laser couplers, waveguides, decoration and architecture.

Embossable layers: bloom systems, focusing in detector fields, illumination of flat-panel display screens, imaging in photocopiers, fibre optics (light introduction).

Lithography: production of micro-optical elements, such as waveguides, gratings, pinholes, diffraction gratings (dot gratings) and in the area of display technology, fibre-chip coupling and imaging optics.

The examples below serve for further explanation of the invention and do not have a restricting character.

Preparation of Coating Sols

EXAMPLE 1

Synthesis of a Sol for the Production of Layers of High Refractive Index 100 g of isopropanol are mixed with 18 g of methacrylic acid and 1.348 g of bidistilled $H_2O$. After the mixture has been stirred for 10 minutes, 13.813 g of tetraisopropyl orthotitanate are slowly added dropwise with stirring. After the mixture has been stirred for 15 minutes, 10 g of 2-isopropoxyethanol are added. The mixture is subsequently stirred at 25° C. for 24 hours. A transparent, agglomerate-free sol of surface-modified $TiO_2$ nanoparticles is obtained.

0.08 g of 1-hydroxycyclohexyl phenyl ketone (IRGACURE 184, Ciba-Geigy) and 0.02 g of 1-methylimidazole are added to the sol; after vigorous stirring, the mixture is filtered and can then be employed as coating material.

EXAMPLE 2

Synthesis of a Sol for the Production of Layers of Low Refractive Index 31.388 g of TEOS are mixed with 20.264 g of ethanol. In parallel, 20.264 g of ethanol, 0.9 ml of 4 M HCl and 22.275 g of bidistilled $H_2O$ are mixed. The two mixtures are then combined. The TEOS sol can be employed after about 10 minutes. 12.1 g of methacrylic acid are added with stirring. The reaction mixture is then stirred at 25° C. for 2 hours. A transparent, agglomerate-free sol of surface-modified $SiO_2$ nanoparticles is obtained.

The two sols are mixed in accordance with the desired solids content of $SiO_2$ or $TiO_2$, the dilution being set using isopropanol. In addition, 0.45% of the total weight of flow-control agent (BYK®-306, polyether-modified polydimethylsiloxane solution) is added to the mixture. 0.08 g of 1-hydroxycyclohexyl phenyl ketone (IRGACURE® 184, Ciba-Geigy) and 0.02 g of 1-methylimidazole are added to the sol. After vigorous stirring, the mixture is filtered and can then be used as coating material.

EXAMPLE 3

Synthesis of a Sol for the Production of Layers of High Refractive Index 0.663 g of tributyl phosphate are added to 28.95 g of $TiO_2$ sol, prepared as described in Example 1, and the mixture is stirred for 3 hours. A solution of 0.4 g of distilled γ-glycidylpropyltrimethoxysilane (GPTS) in 30 g of 2-isopropoxyethanol is subsequently added dropwise to the sol at 100° C. After 1 hour, the batch is cooled to room temperature, and 0.3 g of hydrolysed GPTS is added. In order to carry out the GPTS hydrolysis, 2.70 g of 0.1N HCl solution are added to 23.63 g of GPTS (dist.), and the mixture is stirred for 24 hours. The low-molecular-weight reaction products are subsequently removed by distillation at 3 mbar, 25° C. After the mixture has been stirred for 15 minutes, the batch is distilled under reduced pressure of 3 mbar and subsequently diluted with 120 g of 2-isopropoxyethanol. A transparent, agglomerate-free sol is obtained.

EXAMPLE 4
Synthesis of a Sol for the Production of Layers of Low Refractive Index 0.96 g of 0.1N HCl solution is added to a mixture of 11.81 g of GPTS (dist.) and 4.15 g of tetraethoxysilane (TEOS) for hydrolysis and condensation. The reaction mixture is then stirred at 20° C. for 24 hours, after which the low-molecular-weight constituents are stripped off at 3 mbar in a vacuum distillation. The reaction product which remains is subsequently diluted with 22 g of isopropoxyethanol as solvent. 0.08 g of 1-hydroxycyclohexyl phenyl ketone (IRGACURE®184, Ciba-Geigy) and 0.02 g of 1-methylimidazole are then added to the sol. After vigorous stirring, the mixture is filtered and can them be employed as coating material.

Production of Interference Layer Packages

EXAMPLE 5
Production of a 2-layer Antireflection Coating (Quarterwave $TiO_2$ and Quarter-wave $SiO_2$) on Glass A sheet of glass is cleaned and then coated with the sol from Example 1 by dip coating (drawing rate 2.5 mm/s) and subsequently dried by means of a UV drier (Belltron) at a belt speed of 2 m/min and a UV irradiation power of 450 mW/cm$^2$. The sheet is subsequently dip-coated with the sol from Example 2 at a drawing rate of 3.2 mm/s.

The double-coated sheet is then placed directly in an oven preheated at 450° C. and left there for 10 minutes. Finally, the sheet is removed from the oven and cooled to room temperature in air. The sheet has an anti-reflection coating with the reflection spectrum shown in FIG. 1. A V-filter with a reflection minimum of 0% at a wavelength of 560 nm is evident.

EXAMPLE 6
Production of a 3-layer Antireflection Coating on Glass

The coating sol from Example 1 is mixed vigorously with the coating sol from Example 2 in the ratio 1:0.7% by weight (solids). A sheet of glass is coated with this sol mixture by the dipping method at a drawing rate of 2.7 mm/s and cured with UV light analogously to Example 5. In order to prepare the coating sol for the second layer, the sol from Example 1 is mixed with the sol from Example 2 in the ratio 1:0.85% by weight (solids), and the sheet is then dip-coated at a drawing rate of 2.85 mm/s and subsequently cured using UV light analogously to Example 5. In the next step, the sheet is dip-coated with the sol from Example 2 at a drawing rate of 3.6 mm/s.

Figure 2:
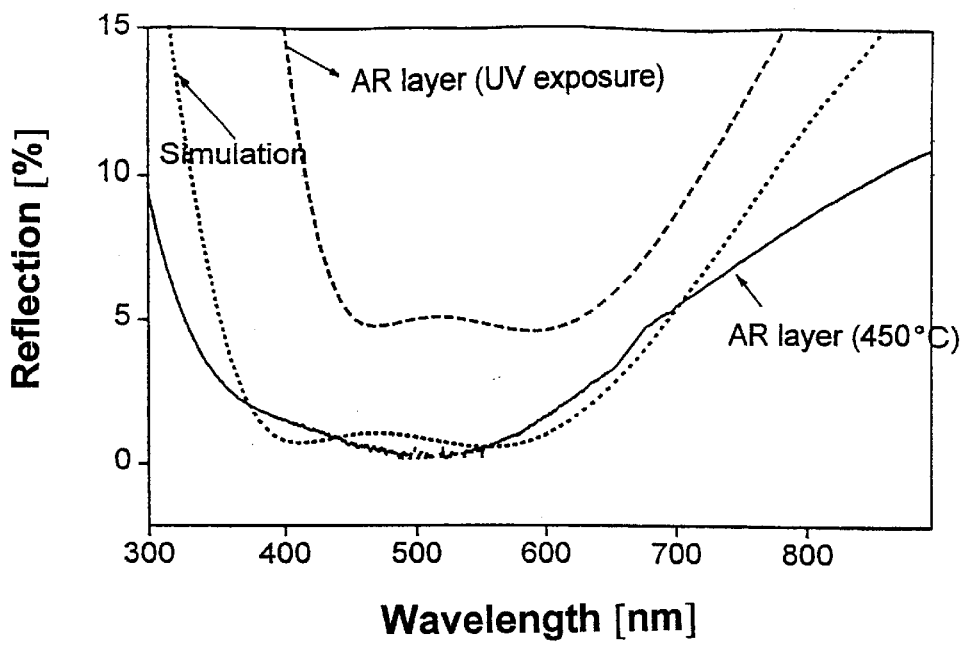
FIG. 2 shows the reflection spectrum of a glass sheet treated in accordance with Example 6.

The triple-coated sheet is then placed directly in an oven preheated to 450° C. and left there for 10 minutes. Finally, the sheet is removed from the oven and cooled to room temperature in air. The sheet now has an antireflection coating with the reflection spectrum shown in FIG. 2. It can be seen that the reflection spectrum after UV exposure has the W filter shape which is typical of a 3-layer structure. The one-step baking produces a reflection minimum throughout the spectral region from 380 nm to 610 nm with a residual reflection of ≦2%. In the range between 450 nm and 560 nm, the reflection is less than 1%, and 0% reflection is achieved at 500 nm. The measured curve agrees very well with the curve calculated via simulation.

EXAMPLE 7
Production of a 5-layer Antireflection Coating

A sheet of glass is cleaned by the usual methods and dip-coated firstly with the sol from Example 1 at a drawing rate of 1.2 mm/s and immediately cured using UV (analogously to Example 5). The sheet is then dip-coated with the sol from Example 2 at a drawing rate of 2.45 mm/s and again cured by means of UV. The sheet is then dip-coated again with the sol from Example 1 at a drawing rate of 1.2 mm/s and cured by means of UV. The sheet is then dip-coated again with sol from Example 2 at a drawing rate of 2.45 mm/s. A coating with the sol from Example 1 is then again applied at a drawing rate of 1.2 mm/s.

Figure 3:
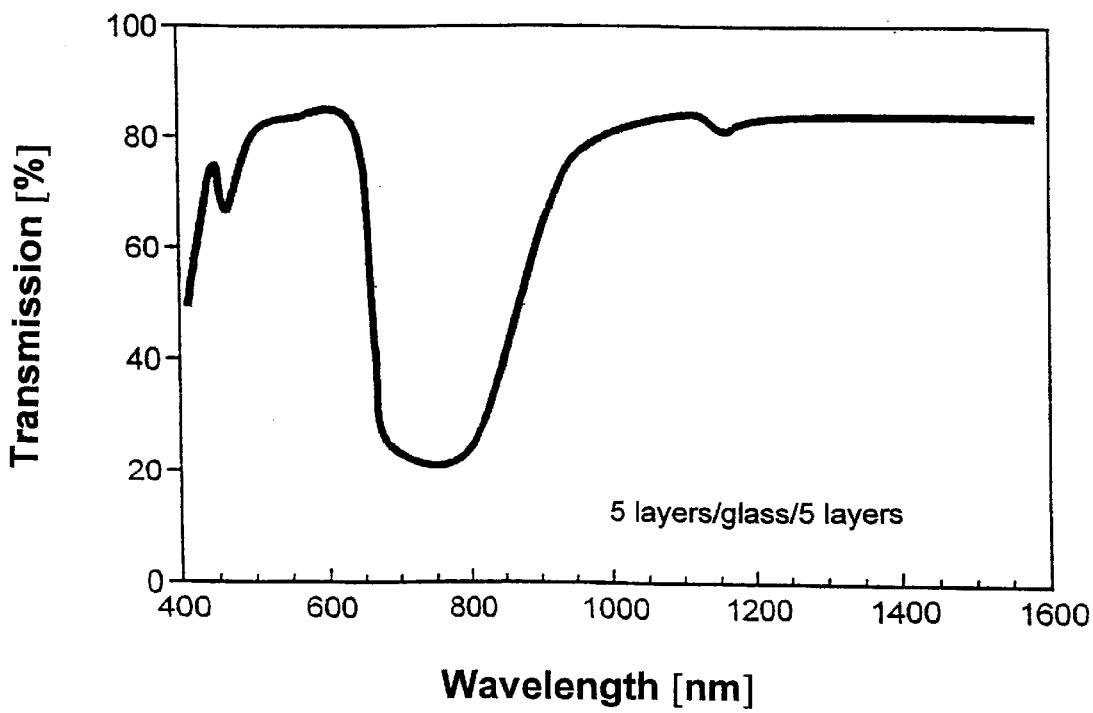
FIG. 3 shows the transmission spectrum of a glass sheet treated in accordance with Example 7.

The pentuple-coated sheet is then placed directly in an oven preheated to 450° C. and left there for 10 minutes. Finally, the sheet is removed from the oven and cooled to room temperature in air. The sheet represents an interference filter with 5 individual layers on each side and with the transmission spectrum shown in FIG. 3. A band pass filter for the wavelength range between 620 nm and 900 nm is evident.

What is claimed is:

1. A method for producing an inorganic multilayered optical system, comprising the steps of:
   (a) applying to a glass substrate a flowable composition comprising nanoscale inorganic solid particles having polymerizable and/or polycondensable organic surface groups, the flowable composition being such that when polymerized and/or polycondensed to form an organically crosslinked layer on the glass substrate and then baked to remove organic constituents and densify the layer, it has a refractive index;
   (b) polymerizing and/or polycondensing the organic surface groups of the solid particles, thereby forming the organically crosslinked layer;
   (c) applying to the organically crosslinked layer a flowable composition comprising nanoscale inorganic solid particles having polymerizable and/or polycondensable organic surface groups, the flowable composition being such that when polymerized and/or polycondensed to form an organically crosslinked layer and then baked to remove organic constituents and densify the layer, it has a refractive index that is different from the refractive index of the layer beneath;
   (d) polymerizing and/or polycondensing the organic surface groups of the solid particles of the flowable composition of step (c), thereby forming the organically crosslinked layer;
   (e) optionally repeating steps (c) and (d) at least once, thereby forming at least one more organically crosslinked layer on the layers already present; and
   (f) baking the multilayered substrate, thereby removing organic constituents and densifying the layers to form the inorganic multilayered optical system.

2. The method of claim 1 where step (d), or the last step (d) if step (e) is performed, is performed by baking as a part of step(f).

3. The method of claim 1 where the steps of forming the organically crosslinked layers are performed in the temperature range from 10° C. to 50° C.

4. The method of claim 3 where the steps of forming the organically crosslinked layers are performed in the temperature range from 10° C. to 30° C.

5. The method of claim 1 where the steps of forming the organically crosslinked layers comprise photochemically polymerizing and/or polycondensing the organic surface groups of the solid particles.

6. The method of claim 1 where the step of baking is performed at a temperature in the range from 400 to 800° C.

7. The method of claim 6 where the step of baking is performed at a temperature in the range from 400 to 600° C.

8. The method of claim 1 where the step of baking is performed by heating the multilayered substrate from an outermost organically crosslinked layer inward in the direction of the substrate.

9. The method of claim 8 where the heating rate for the layers is at least 100 K/min.

10. The method of claim 1 where the nanoscale particles are nanoscale particles of metal compounds.

11. The method of claim 10 where the nanoscale particles are selected from nanoscale particles of metal oxides, metal sulfides, metal selenides, metal tellurides, and mixtures thereof.

12. The method of claim 11 where the nanoscale particles are selected from nanoscale particles of $SiO_2$, $TiO_2$, $ZrO_2$, $ZnO$, $Ta_2O_5$, $SnO_2$, $Al_2O_3$, and mixtures thereof.

13. The method of claim 1 where the polymerizable and/or polycondensable surface groups are selected from organic radicals containing an acrylyl, methacrylyl, vinyl, allyl, or epoxide group.

14. The method of claim 1 where the solid particles have been produced by surface modifying nanoscale inorganic solid particles with the polymerizable and/or polycondensable surface groups.

15. The method of claim 1 where the solid particles have been produced by a method using at least one compound containing the polymerizable and/or polycondensable surface groups.

16. The method of claim 1 where the nanoscale inorganic solid particles have been produced by the sol-gel method.

17. The method of claim 1 where each flowable composition has a pH in the range from 3 to 8.

18. An inorganic multilayered optical system produced by the method of claim 1.

19. An interference filter or anti-reflection system comprising the inorganic multilayered optical system of claim 18.

* * * * *